US008990589B1

(12) United States Patent
Kazarkin

(10) Patent No.: US 8,990,589 B1
(45) Date of Patent: Mar. 24, 2015

(54) SYSTEM AND METHOD FOR ROBUST FULL-DRIVE ENCRYPTION

(71) Applicant: Kaspersky Lab ZAO, Moscow (RU)

(72) Inventor: Lev A. Kazarkin, Novosibirsk (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 14/490,185

(22) Filed: Sep. 18, 2014

(51) Int. Cl.
G06F 21/00 (2013.01)
G06F 12/14 (2006.01)
G06F 21/62 (2013.01)
G06F 3/06 (2006.01)

(52) U.S. Cl.
CPC ............ G06F 12/1408 (2013.01); G06F 21/62 (2013.01); G06F 3/0622 (2013.01); G06F 3/0655 (2013.01); G06F 3/0674 (2013.01); G06F 2212/1052 (2013.01)
USPC .............................. 713/193; 713/189; 726/26

(58) Field of Classification Search
USPC .......................................................... 713/193
See application file for complete search history.

(56) References Cited

U.S. PATENT DOCUMENTS

| 8,341,430 | B2 | 12/2012 | Ureche et al. |
| 8,407,403 | B2 | 3/2013 | Prabhakaran et al. |
| 8,429,499 | B2 | 4/2013 | Akiyama et al. |
| 8,495,386 | B2 | 7/2013 | Hunt |
| 8,595,493 | B2 | 11/2013 | Ureche et al. |
| 8,639,947 | B2 | 1/2014 | Elovici et al. |
| 8,646,054 | B1 | 2/2014 | Karr et al. |
| 2003/0188178 | A1* | 10/2003 | Strongin et al. ............... 713/193 |
| 2010/0083005 | A1* | 4/2010 | Ito et al. ......................... 713/193 |
| 2011/0185190 | A1 | 7/2011 | Berengoltz et al. |
| 2012/0173882 | A1 | 7/2012 | Horn et al. |
| 2012/0216052 | A1 | 8/2012 | Dunn |
| 2012/0260101 | A1 | 10/2012 | Hunt |
| 2013/0067210 | A1 | 3/2013 | Nelson et al. |
| 2013/0275479 | A1 | 10/2013 | Thadikaran et al. |
| 2014/0101455 | A1 | 4/2014 | Bauman et al. |

FOREIGN PATENT DOCUMENTS

| GB | 2499963 | 9/2013 |
| JP | 4941556 | 5/2012 |
| WO | WO2012094367 | 7/2012 |
| WO | WO2013173986 | 11/2013 |

* cited by examiner

Primary Examiner — Yogesh Paliwal
(74) Attorney, Agent, or Firm — Patterson, Thuente Pedersen, P.A.

(57) ABSTRACT

System and method for fault-recoverable full-drive encryption. A buffer is allocated to temporarily retain different subsets of the plurality of segments at various times. An encrypted space mask represents an encryption state of each segment. Prior to encrypting each subsequent segment, a first copy of the encrypted segment is stored in the buffer, and a second copy of the encrypted segment is stored on the data storage drive. The encrypted space mask is updated to represent a current encryption state of the plurality of segments. In response to an interruption of the encrypting process, the encrypted space mask and, in some embodiments, the buffer, are used to identify a correct encryption state of the drive, permitting recovery and resumption of the encryption process.

24 Claims, 12 Drawing Sheets

SYSTEM AND METHOD FOR ROBUST FULL-DRIVE ENCRYPTION

FIELD OF THE INVENTION

This invention relates to information systems, and more particularly, to systems and methods for improving the robustness of a disk encryption operation.

BACKGROUND OF THE INVENTION

Incidents of data theft and related losses are becoming more and more frequent for corporate and individual computer users. Data encryption continues to be a viable solution to preventing unauthorized access to confidential information. One of the more effective forms of data encryption is full-drive encryption, in which the entire drive content is encrypted as a whole. In this case, access to specific files of an encrypted drive is performed by decrypting data "on-the-fly", i.e., specific sectors of the drive containing the requested file are decrypted in the random access memory, while the whole drive remains encrypted. Once the work with the file is finished, the file is encrypted "on-the-fly" as well—the file is split in parts equal to the drive sector size; these parts are encrypted and saved to the drive.

The process of initial encryption of the entire drive requires significant computing resources of the processor, causes increased wear of the drive and can take a long time (from a few hours to several days or even weeks). The drive data are split into segments of a pre-defined size, then each segment is separately encrypted and saved to the drive. The encryption operation generally involves reading a segment from the drive into memory, applying a computational algorithm to the segment of data to convert the data into an encrypted representation, then writing the encrypted segment of data back to its original location on the drive.

If, during this process, a system fault occurs, such as an unexpected stoppage of the operating system, sudden loss of power, or the like, the drive contents may become lost or corrupted since a portion of the data would be encrypted while another portion remains in its plain form, i.e., non-encrypted, and it is unknown which portion is which. A mechanism is needed to enable data recovery of partially-encrypted drives that are in a state following a sudden interruption of the full-drive encryption process.

SUMMARY OF THE INVENTION

One aspect of the invention is directed to a system for performing fault-recoverable full-drive encryption in a computer system having computing hardware including a data storage drive containing content to be encrypted. The system includes a coordinator engine configured to establish a plurality of segments in which the content to be encrypted is contained, with each segment of the plurality of segments having a corresponding location on the data storage drive, an encryption engine configured to sequentially encrypt each segment of the plurality of segments to produce a corresponding encrypted segment, and a fault recovery engine.

The coordinator engine is further configured to allocate a buffer in non-volatile storage that is configured to temporarily retain different subsets of the plurality of segments at various times, and store an encrypted space mask in non-volatile storage that represents an encryption state of each segment of the plurality of segments. In response to the encrypting of each segment and prior to encrypting a subsequent segment, a first copy of the encrypted segment is stored in the buffer, and a second copy of the encrypted segment is stored in a defined location on the data storage drive. The encrypted space mask is updated to represent a current encryption state of the plurality of segments.

The fault recovery engine is configured to identify a second segment, of which a first encrypted copy is stored in the buffer, but where the encrypted space mask indicates the second segment as not being encrypted, the second segment being subsequent to a first segment indicated as being encrypted in the encrypted space mask, in response to an interruption of the sequential encrypting of the plurality of data segments.

Further, the fault recovery engine determines a current encryption state of the second segment in response to the identifying of the second segment, and based on the first encrypted copy of the second segment stored in the buffer. In response to determining the current encryption state of the second segment, the fault recovery engine corrects the encrypted space mask to indicate the current encryption state of the second segment.

Related aspects are directed to a method and variations thereof, for performing fault-recoverable full-drive encryption in a computer system.

BRIEF DESCRIPTION OF THE DRAWINGS

The invention may be more completely understood in consideration of the following detailed description of various embodiments of the invention in connection with the accompanying drawings, in which.

Figure 1:
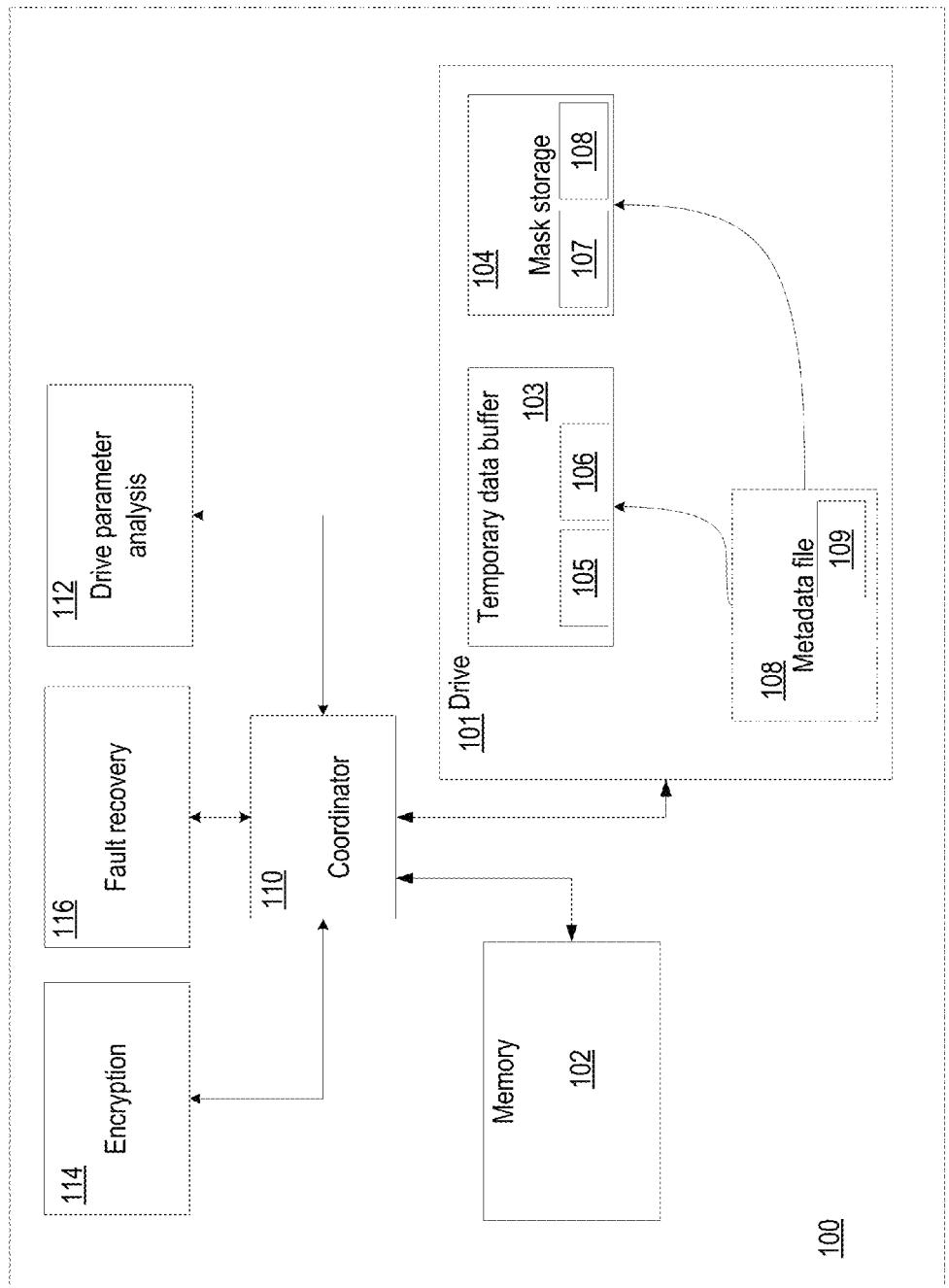
FIG. 1 is a block diagram depicting an exemplary system in which aspects of the invention are implemented by various computing engines according to one embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

Aspects of the present invention can be implemented as part of a computer system. The computer system can be one physical machine, or can be distributed among multiple physical machines, such as by role or function, or by process thread in the case of a cloud computing distributed model. In various embodiments, aspects of the invention can be configured to run in virtual machines that in turn are executed on one or more physical machines. It will be understood by persons of skill in the art that features of the invention may be realized by a variety of different suitable machine implementations.

The system includes various computing engines, each of which is constructed, programmed, configured, or otherwise adapted, to carry out a function or set of functions. The term engine as used herein means a real-world device, engine, or arrangement of engines implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. A engine can also be implemented as a combination of the two, with certain functions facilitated by hardware alone, and other functions facilitated by a combination of hardware and software. In certain implementations, at least a portion, and in some cases, all, of a engine can be executed on the processor(s) of one or more computers that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of suitable configurations, and should generally not be limited to any particular implementation exemplified herein, unless such limitations are expressly called out. In addition, a engine can itself be composed of more than one sub-engines, each of which can be regarded as a engine in its own right. Moreover, in the embodiments described herein, each of the various engines corresponds to a defined functionality; however, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

FIG. 1 is a block diagram depicting an exemplary system 100 in which aspects of the invention are implemented. The computer system 100 has a non-volatile data storage device implemented by any suitable information medium known of arising in the future, that provides random access and the possibility of multiple re-writing of the medium's content, such as a magnetic hard disk drive (HDD), solid-state drive (SDD), a magneto-optical drive, or the like. For the sake of brevity, the non-volatile data storage device will be referred to herein simply as drive 101. Drive 101 can be described by a set of drive parameters, which can include: the size of the drive, its media technology, the number of tracks and sectors of the drive, the number of damaged sectors of the drive, etc. The drive 101 can contain multiple logical partitions, one or more of which can have an operating system (OS) installed, such as, for example: Microsoft Windows™, Unix, Mac OS™, etc. The data contained on drive 101 can include, for example, various files and the hierarchical folder structure managed by the operating system. Drive contents can also include all of the application and system programs, as well as other data structures, such as the operating system's registry and other data stored on the drive.

According to one embodiment, during full-drive encryption, in order to increase the encryption speed and to make the encryption system fault-proof, the drive is split into defined data segments of equal size. Accordingly, during the decryption of a fully-encrypted drive, it will be already split into data segments.

In one type of embodiment, the system and algorithms used for encryption and decryption are generally the same. Therefore, for brevity purposes, the description of the implementation methods below will present methods applicable for full-drive encryption. This implies that the decryption uses the same system engines and method steps. However, if specific method steps or system engines are different for the drive decryption method, this will be mentioned when describing the embodiments.

As depicted in FIG. 1, a system according to one embodiment includes coordinator engine 110, drive parameter analysis engine 112, encryption engine 114, and fault recovery engine 116. Coordinator engine 110 supervises the encryption/decryption and fault recovery processes, and reads from and writes to the drive 101 and memory 102. Drive parameter analysis engine 112 ascertains the relevant parameters of the disk drive, and defines the segment size to be used for the full-drive encryption. Encryption engine 114 encrypts/decrypts data segments. Fault recovery engine 116 ascertains disparities that indicate a problem with the full-drive encryption process, such as in the event of a system crash, and performs operations to automatically recover from the problem.

Drive parameter analysis engine 112 is configured to determine pertinent drive parameters and, based on the values of those parameters, to determine the data segment size for the full-drive encryption. For example, in the Windows™ family of operating systems, the drive size parameter can be identified using the control code IOCTL_DISK_GET_LENGTH_INFO of the DeviceIoControl function from the Windows API (application programming interface).

Figure 2:
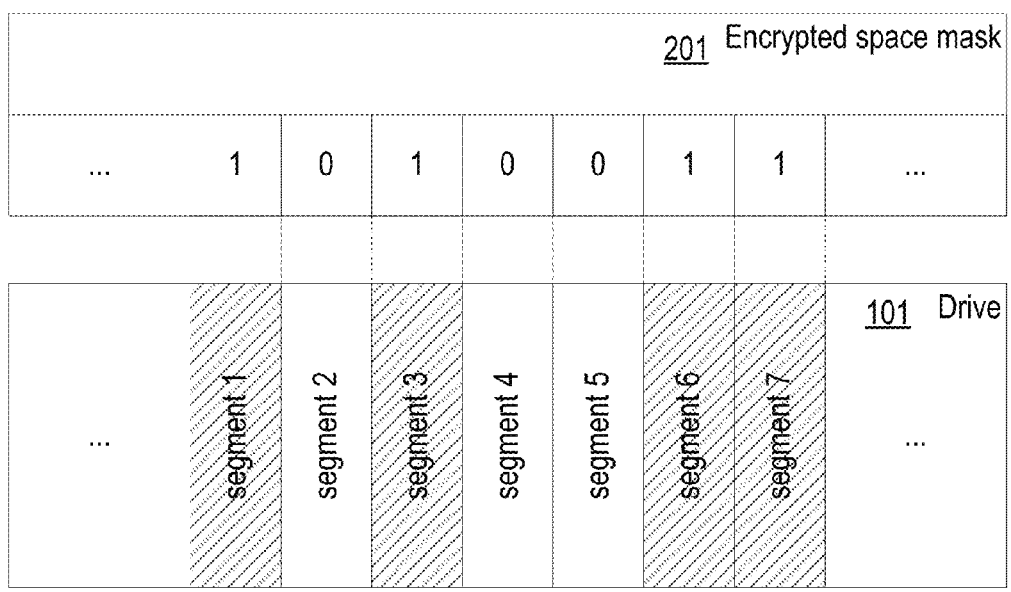
FIG. 2 is a diagram illustrating an exemplary encrypted space mask data structure according to one embodiment.

In one embodiment, to ensure data safety and the possibility of resuming the encryption process after a system fault (for example, a power outage, occurrence of errors in the system (for example, a fault during the initiation of the input/output system), etc.), a mask of the encrypted space is created at the beginning of the encryption process according to one embodiment. The encrypted space mask contains an indicator pertaining to each data segment, namely, whether it is encrypted. The drive parameter analysis engine 112 is also configured to create the mask representing an encrypted space. FIG. 2 and its corresponding description below provides one example of an encrypted space mask.

In a related embodiment, system 100 further stores a temporary data buffer 103, which is utilized for temporary storage of a portion of the disk contents during the encryption process. Use of temporary data buffer 103, in conjunction with the mask, are reliable indicators of whether segments of data on the drive are encrypted. These indicators provide assurance that, in the event of a crash of computer system 100 during the encryption process in which segments of data are converted between their plain state and their encrypted state, the correct content of the drive can be ascertained.

In a particular embodiment, the temporary data buffer 103 has a circular buffer structure. However, it should be understood that the temporary data buffer 103 can have any other suitable data structure—for example, a linked list, an array, a queue, etc.

In one embodiment, the system contains a mask storage space 104, in which the encrypted space mask is saved and updated during the encoding of the drive. The encrypted space mask contains information about the dynamic encryption state of data segments of drive 101. In a related embodiment, mask storage space 104 includes version history, either in the form of earlier-saved copies, or a more compact change log.

As stated above, coordinator engine 110 accesses drive 101 and memory 102, and exchanges information with the other engines. Coordinator engine 110 is configured to load data segments from the drive to the system's memory 102. Encryption engine 114 is configured to perform an encryption operation on each loaded data segment in response to the loading of that segment by coordinator engine 110. Following encryption, coordinator engine 110 writes the encrypted segment to the temporary data buffer 103.

In one related embodiment, the mask storage 104 can be contained on the drive in multiple copies, in order to ensure extra protection of the encrypted space mask and to ensure the possibility of resuming the encryption process in case of a system fault. In this embodiment, multiple mask storages can be located in different locations of the drive. In this manner, if a large number of damaged sectors occurs in one area of the drive, the probability of simultaneous occurrence of a similar situation in another area of the drive will be extremely low. In another embodiment, encrypted space masks of different versions can be contained directly on the drive 101.

In another type of embodiment, the temporary data buffer 103, mask storage space 104, or both, can be stored on a medium that is different than drive 101. For instance, each of these data structures can be stored on a second drive, or on a different logical partition of drive 101. In the case of storage of these data structures on a different drive, it is contemplated that the different drive can be interfaced with a remote computer system communicatively coupled to computer system 100.

In a related embodiment, coordinator engine 110 is further configured to write encrypted data segments to the drive 101 and to the temporary data buffer 103. Additionally, in this embodiment, the coordinator engine 110 is configured to create an encrypted space mask file on the drive and place the encrypted space mask in that file. Coordinator engine 110 is additionally configured to update the encrypted space mask during the writing of encrypted data segments to the drive, and to save the encrypted space mask to the mask storage 104.

Coordinator engine 110 is additionally configured to save the encrypted space mask to the drive if certain conditions are met. For example, a mask can be saved from the random access memory to the drive periodically, as well as at certain milestones, such as at a partial or full update of the temporary data buffer 103.

In a related embodiment, the system 100 includes a fault recovery engine 116 that operates to ensure recoverability of the drive encryption process in the event of a system fault. In one embodiment, fault recovery engine 116 is configured to read the last saved encrypted space mask from the mask storage 104. The fault recovery engine 116 is further configured to change, in the encrypted space mask, the value of the indicator determining that the data segments are encrypted, to the opposite value. Hereinafter, for brevity purposes, the indicators determining whether a data segment is encrypted will be referred to as encryption indicators. In addition, the fault recovery engine 116 operates to identify such data segments contained in the temporary data buffer 103 for which the encryption indicator in the encrypted space mask is different from the condition of the data segments on the drive. In one embodiment, a drive can contain a metadata file 108, which, in turn, contains pointers to the temporary data buffer 103 and to the mask storage 104, as well as an indicator 109 indicating whether the drive is encrypted or undergoing encryption.

In one embodiment, in order to determine the sequence in which encrypted data segments are saved to the drive, a sequential segment index number 105 is used, which is incremented for each encrypted data segment written to the drive. In this type of embodiment, a sequential segment index number 105 is saved to the temporary data buffer 103 together with each data segment.

In one embodiment, additional information 106 can be saved to the temporary data buffer 103 by the coordinator engine 110, for example: a pointer to the beginning of an encrypted data segment on the drive, or a checksum of that data segment. Here, the encrypted space mask is updated when a new encrypted data segment is saved to the drive, thereby creating a new encrypted space mask. To reflect the match between the encrypted space mask and the last data segment encrypted and saved to the drive, a mask index number 107 can be used. In a related embodiment, the value of the mask index number 107 is equal to the quantity of mask indicators (e.g., bits of the mask) that have been set to indicate that corresponding data segments are encrypted.

In another related embodiment, the fault recovery engine 116 is additionally configured to read the sequential segment index number 105 in the temporary data buffer 103, read the mask index number 107 in the mask storage space 104, and toggle the encryption indicator to the opposite value.

In this type of embodiment, a mask index number 107 can be also saved to the mask storage space 104 together with each encrypted space mask. In another related embodiment, additional information 108 can be saved to the mask storage 104, for example: a pointer to the beginning of the last saved data segment on the drive, or a checksum of the encrypted space mask together with the additional information specified above.

In another embodiment, the drive 101 contains a custom MBR (master boot record for the BIOS systems), different from the original MBR in that, together with the code that activates the pre-boot authentication environment, or in the absence of such code, it can additionally contain pointers to the metadata file 108, a pre-boot agent (not shown) contained on the drive, the temporary data buffer and a pointer to the mask storage. The custom MBR can also contain an indicator determining whether a drive is encrypted or undergoing encryption.

FIG. 2 is a diagram illustrating one example of an encrypted space mask 201. In this example, the encrypted space mask 201 is represented as a bitmap sequence. Each data segment of the drive 100 corresponds to a bit in the encrypted space mask 201. In this case, the value of the bit in the encrypted space mask 201 determines whether the corresponding data segment is encrypted (for example, the bit can acquire the value of 1 when the data segment is encrypted and the value of 0 when the data segment is decrypted). In this example, as depicted, data segments 1, 3, 6, 7 are encrypted, while segments 2, 4, 5 are non-encrypted. For such a drive, the encrypted space mask will take the value of 1010011.

The data structure used to represent the encrypted space mask can have various forms. For example, in various embodiments, an encrypted space mask can be represented as an n-dimensional array (with n being a value of 1 or more), a binary search tree, an interval graph, a multi-level bitmap, and the like.

Figure 3:
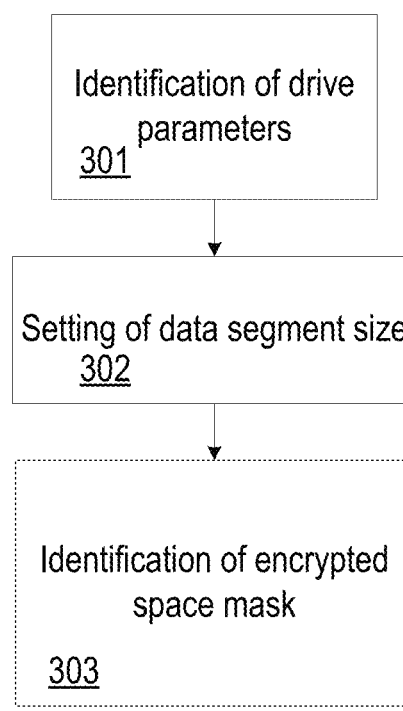
FIG. 3 is a flow diagram illustrating a process for identifying an encrypted space mask according to one example embodiment.

FIG. 3 illustrates a process for identifying an encrypted space mask according to one example embodiment. At 301, the drive parameter analysis engine 112 identifies drive parameters, which can include: the drive size, type, number of damaged drive sectors, etc. At 302, the drive parameter analysis engine 112 sets the segment size, which depends on the drive parameters. At 303, depending on the data segment size, the coordinator engine 110 defines the encrypted space mask, which contains an encryption indicator for each data segment and initially represents a non-encrypted state for the entire drive (e.g., all the bits of the encrypted space mask can be equal to zero). The size of the encrypted space mask is set depending on the data segment size and drive capacity (for example, the quotient of the drive size divided by the data segment size).

During the encryption process, each data segment will be re-written on the drive as a unit. Therefore, according to one embodiment, in order to attain a high productivity during the encryption of a drive, the data segment size is selected by drive parameter analysis engine 112 to be divisible by the size of the physical sector and by the size of the erasing segment (for a solid state drive).

In a related embodiment, the data segment size can be equal to the square root of the drive size in bytes. For example, for a 1 terabyte drive, the data segment size will be equal to 1 megabyte. In this case, the encrypted space mask size will be equal to the relation of the drive size to the data segment size and can be 128 kilobytes for representation in the form of a linear binary bitmap.

In another embodiment, the encrypted space mask can have the structure of a multi-level bitmap. For example, for a bitmap in the form of a matrix, the data segment size can be comparable with the cube root of the drive size in octets. Therefore, for a 1 terabyte drive, the data segment size can be 16 kilobits.

Figure 4:
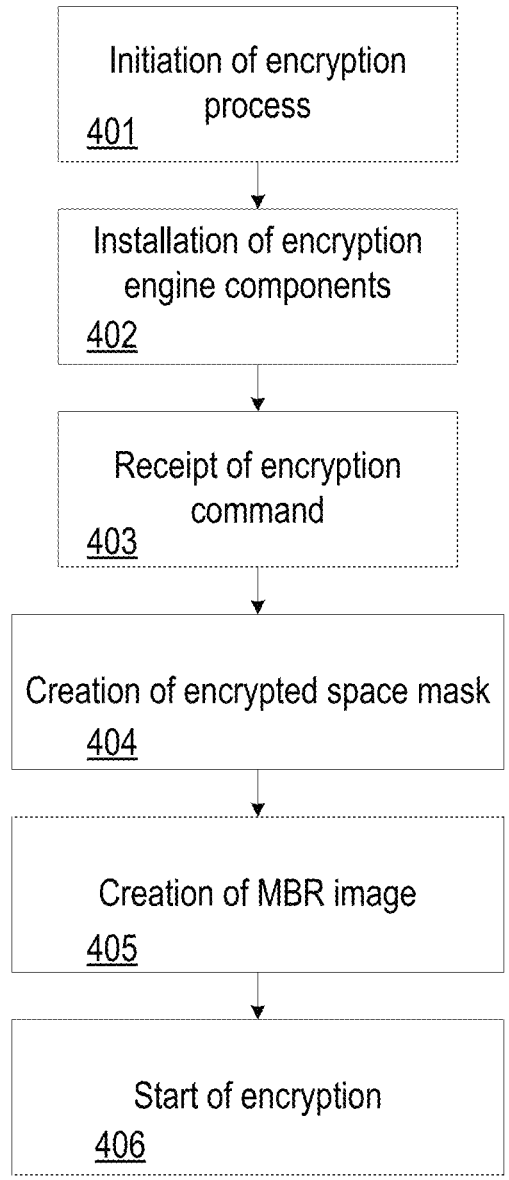
FIG. 4 is a flow diagram illustrating a process of setting up, or initiating, a full-drive encryption according to one embodiment.

FIG. 4 is a flow diagram illustrating a process of setting up, or initiating, a full-drive encryption according to one embodiment. First, at 401, the encryption process is initiated—the coordinator engine 110 creates blank files of the temporary data buffer 103 and of the mask storage 104. It should be noted that, at this stage, the log files can be already located on the drive. In this case, their content will be cleared. Then, at 402, a set of encryption engine components, and other tools which are required in order to perform full-drive encryption and in order to ensure completion of the PBA (pre-boot authentication), are installed. Thereafter, the computer system can be restarted to check for correct functioning of the drivers. For example, if system errors occurred after the restart, then, at the subsequent boot, the system can be restored from the last system restore point, but in this case full-drive encryption can be cancelled.

At 403, the coordinator engine 110 sends a command indicating a need for encryption to the encryption engine 114. In one embodiment, before starting the encryption, metadata file 108 can be created on the drive, which, in turn, can contain pointers to the temporary data buffer 103 and to the mask storage 104, as well as an indicator 109 indicating whether the drive is encrypted, undergoing encryption, or the encryption of the drive has not yet started, i.e. the drive is decrypted. In another embodiment, multiple copies of the metadata file 108 can be saved on the drive in order to ensure additional reliability when encryption is resumed if a system fault occurs.

Then, at 404, an encrypted space mask is created by coordinator engine 110. In one such embodiment, during the full-drive encryption process, all the bits of the newly-created created encrypted space mask can be equal to zero. In another embodiment, during the decryption of an encrypted drive, all the bits of the newly-created encrypted space mask can be equal to one. Then, the encrypted space mask can be saved to the mask storage 103.

At 405, using the drive parameter analysis engine 112, a custom MBR is created. After creation, the custom MBR is saved at the place of the original MBR, which is usually located in the zero sector of the drive. At the boot of the computer system, the BIOS transfers control to the custom MBR, which ensures the loading of the pre-boot agent and the transfer of the execution to it. The copy of the original MBR can be saved in the metadata file 108. The pre-boot agent ensures authentication of the user and the loading of the original MBR from the metadata file 108, which finally transfers control to the operating system. Next, at 406, the encryption engine 114 begins the encryption of the drive. The encryption process is described in more detail below.

Figure 5:
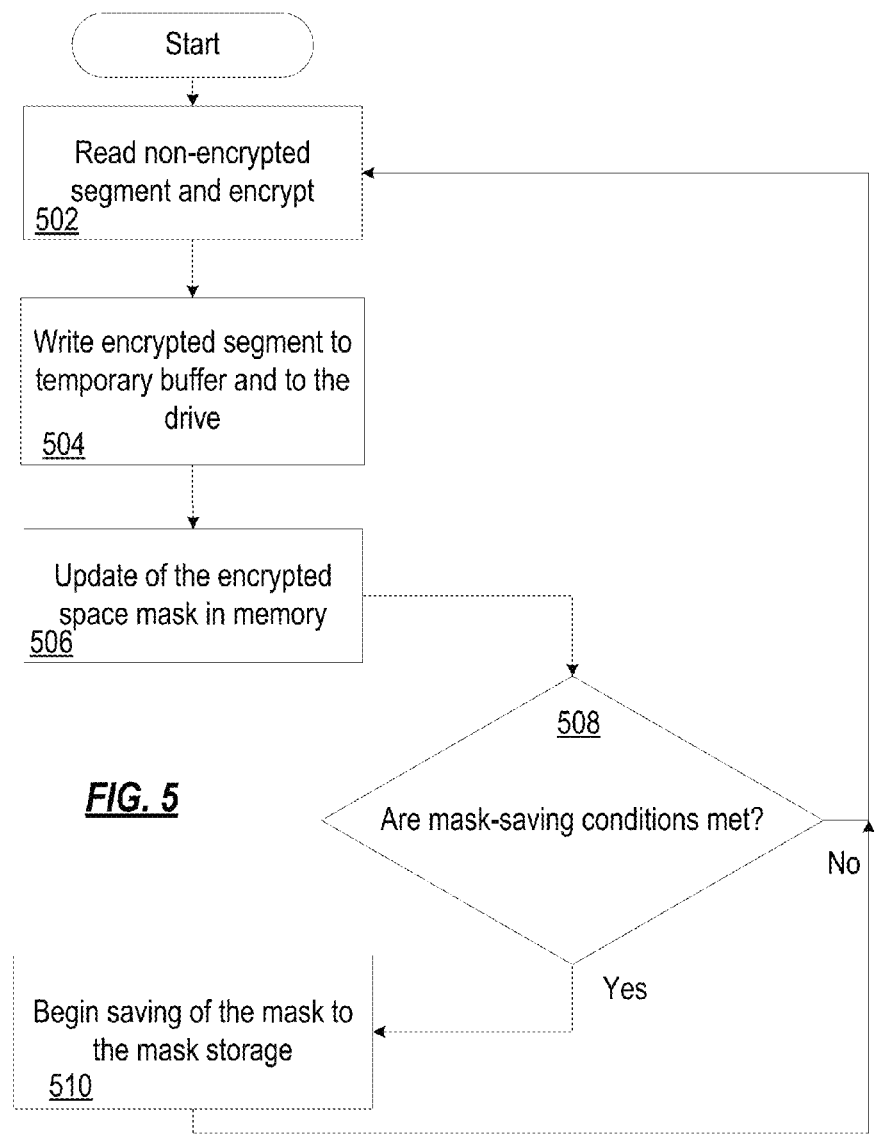
FIG. 5 is a flow diagram illustrating one example of a process for updating the mask of an encrypted space as part of a process of full-drive encryption.

FIG. 5 is a flow diagram illustrating one example of a process for updating the mask of an encrypted space as part of a process of full-drive encryption. At the beginning of the encryption operation, the encrypted space mask can be entirely filled by zeros—no data segments of the drive are encrypted. Similarly, if decryption of the drive is to take place, all the bits of the encrypted space mask will initially be ones to indicated that all data segments on the drive are encrypted.

Therefore, at the beginning of the encryption process, as indicated at segment 502, coordinator engine 110 reads a non-encrypted data segment from the drive (in the encrypted space mask, a zero-valued bit corresponds to such data segments). Then, coordinator engine 110 passes that data segment to encryption engine 114 to encrypt that data segment, after which, at 504, the data segment is written to the temporary data buffer 103 and to the drive. In one embodiment, the sequential segment modification number and additional information (for example: a pointer to the beginning of the encrypted data segment on the drive, or a checksum) can also be written to the temporary data buffer 103, and to the drive.

In the operation of encryption engine 114, a data segment can be encrypted using symmetrical encryption, for example, with a block cipher. Encryption keys can be created, for example, by the encryption engine 114, and can be based on the computer system user's password, for instance, and saved to the drive. At 506, an encryption state indicator for the encrypted data segment is added to the encrypted space mask. For example, if a bitmap is used, the bit corresponding to the encrypted data segment is set to 1. An updated mask can be saved to the drive at this point.

In the embodiment depicted, however, the encrypted space mask can be saved to the drive not immediately, upon updating of the encrypted space mask, but after a number of cycles of encrypting segments of data. This approach avoids frequent re-writing of the content of the mask, which can undesirably increase the wear of the drive and slow down the overall drive encryption process. Accordingly, in one embodiment, as depicted, the encrypted space mask is saved to the drive in the mask storage 104 if one or more mask-saving conditions are met, which are checked at 508. In one such embodiment, the encrypted space mask is saved to the drive after a certain number of encrypted data segments are saved to the temporary data buffer from the last save of the encrypted space mask to the temporary data buffer (for example, if half of the temporary data buffer is re-written).

In a related embodiment, the encrypted space mask can be saved to the drive at certain time intervals (for example, every 10 seconds). In yet another embodiment, the encrypted space mask is saved to the drive when a write-through of data to the drive is requested.

In any event, according to one aspect of the invention, the mask-saving condition is defined such that, if a system fault occurs at any time, the encoded data segments saved to the temporary data buffer 103 and the last saved encrypted space mask will be in a state that is sufficient to restore the encrypted space mask for all encrypted data segments that were saved to the drive or to the temporary data buffer 103 at the moment of the system fault.

As a result, if the conditions determined at 508 are met, the encrypted space mask is saved to the drive beginning at block 510, and the encryption process continues to process the next segment. In the opposite case, the encryption process continues without saving the encrypted space mask to the drive. Since an encrypted space mask, in this embodiment, is saved to the drive less often than encrypted data segments, in the event of a system fault the encrypted space mask contained on the drive may not completely match the condition of the encrypted data segments on the drive. In this case, after the reboot of the system 100, it will be required to update the encrypted space mask, so that the new encrypted space mask properly represents the encryption state of the encrypted data segments on the drive. One exemplary method for modifying the encrypted space mask after a system fault and a system reboot is depicted in FIG. 6.

After being successfully written to the temporary data buffer 103, a processed data segment is written directly to the drive to the location as the first instance of the data segment. In a related embodiment, each segment of encrypted data is located in a different location than the corresponding original un-encrypted data segment's location. Accordingly, in this variation embodiment, the processed data segment is written to a different location on the drive than the original first instance of the data segment. The overall encryption process will be completed when all data segments will be encrypted and saved to the drive 101, and when all the bits of the encrypted space mask will be 1.

In one embodiment, after the completion of the encryption process, the encrypted space mask will be deleted from the memory and from the drive. In another embodiment, after the completion of the encryption process, the temporary data buffer can also be cleared, which will free additional space on the drive. It should be noted that, in a preferred embodiment, block 510 is completed without interrupting the data segment encryption process.

Figure 6A:
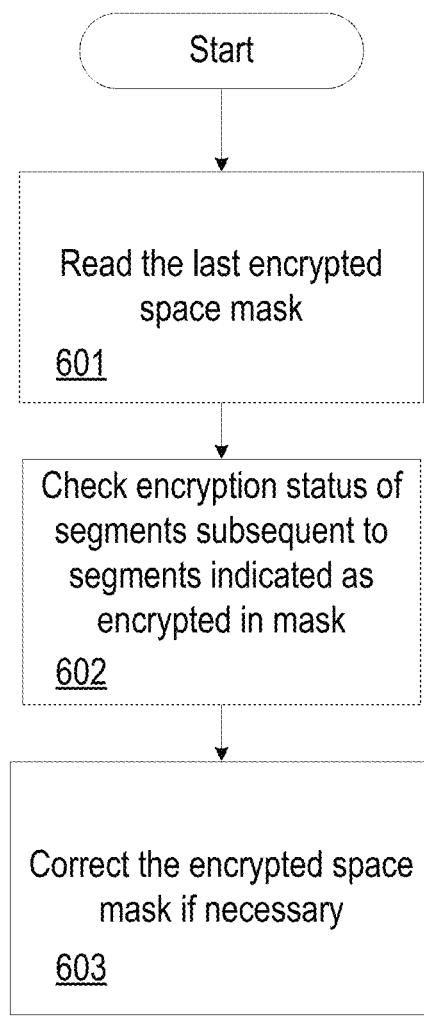
FIGS. 6A-6B are a flow diagrams illustrating methodology for correcting the encrypted space mask in the event of a system fault, according to one type of embodiment.

FIG. 6 is a flow diagram illustrating a method for correcting the encrypted space mask in the event of a system fault, according to one embodiment, carried out using fault recovery engine 116. During the encryption process, a system fault can occur, as a result of which the computer system will be rebooted. The fault can occur at a moment when the encrypted space mask does not match the actual encryption state of the drive. This can be due to the fact that the mask is saved to a drive less often than encrypted data segments are saved to a drive. Even in embodiments that update the encrypted space mask with the encryption of each segment, the mismatch can result from the fact that saving of the mask and writing of the encrypted segment are not precisely simultaneous operations, and that the fault can occur between the time that one is written but the other has not yet been written.

Therefore, in an encrypted space mask on the drive, for some encrypted data segments, encryption indicators can be absent. In order for the encryption process to be restored and resumed, the encryption indicators contained in the encrypted space mask must match the encrypted segments on the drive.

To this end, at 601, using fault recovery engine 116, the encrypted space mask last saved on the drive is read. Next, fault recovery engine 116 identifies data segments, if any, for which the encryption status is incorrectly indicated by the encrypted space mask. Accordingly, at 602, the encryption status of data segments that are subsequent to data segments indicated as having been encrypted is checked. This can be performed in various ways according to embodiments of the invention. If necessary, the encrypted space mask is updated at 603.

In one embodiment, the temporary buffer 103 is used to check the encryption state of each data segment in question. In an embodiment where sequential segment index number 105 is used, each data segment in temporary buffer 103 is readily identified. The very presence of an indexed data segment in temporary buffer 103 will provide the encrypted value of that data segment. Accordingly, in this embodiment, the encrypted value can be immediately written to the corresponding data segment location on the drive. For instance, in one embodiment, the following is used to modify the encrypted space mask: the sequential segment index number 105 which is stored, together with each encrypted data segment, in the temporary buffer 103, as well as the mask index number, which is contained, as part of additional information 108 together with the encrypted space mask, on drive 101 in mask storage space 104. Thus, at 601, the sequential segment index number 105 is read for each data segment in the temporary data buffer 103 by the fault recovery engine 116. At 602, in the mask storage space 104, using the fault recovery engine 116, the mask index number 107 is additionally read, which corresponds to the last saved encrypted space mask. As a result, at 603, using the fault recovery engine 116, in the encrypted space mask, for the data segments whose sequential data segment index number is greater than the mask index number 107, the encryption indicator bit is toggled to the opposite value.

Figure 6B:
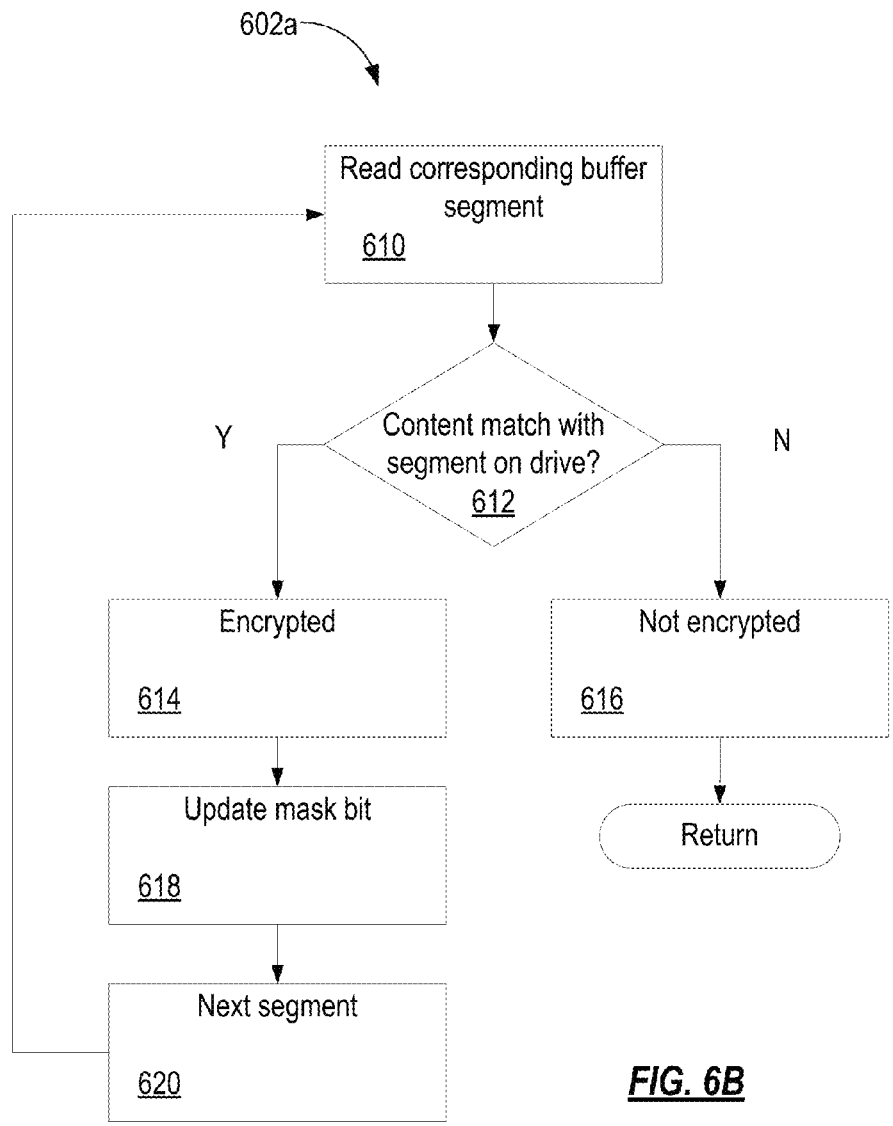

In another embodiment, where each data segment in temporary buffer is not readily identified, an algorithm can be applied that compares the content of each data segment on the drive that is subsequent to a known encrypted data segment, to the content of a corresponding segment of temporary buffer 103. FIG. 6B illustrates one such example, in which a particular example of operation 602 is depicted as 602a. At 610, the corresponding segment of the temporary buffer 103 is read. This corresponding segment's location within temporary buffer 103 can be found because the sequence of use of the temporary buffer 103 is known, and because the last encrypted data segment, as indicated by the encrypted space mask, is also known. At 612, the content of the data segment on the drive is compared against the content of the corresponding data segment location in temporary buffer 103. Since only encrypted data segments are saved in temporary buffer 103, the existence of a match with the corresponding data segment on the drive indicates that the data segment on the drive is encrypted, as indicated at 614.

If the value of a given data segment does not match the condition of the data segment in the temporary data buffer 103, the process can safely conclude that the data segment on the drive has not been encrypted at 616, and the process can branch back to perform the operation at 603 if needed, and further to resume the encryption process at 502. Otherwise, continuing from 614, the encryption space mask bit corresponding to the data segment determined to have been encrypted can be marked at 618 to be updated when the process continues to 603. Meanwhile, and the process continues at 620 to examine the next subsequent data segment.

In another embodiment, the encryption status of the data segments in question can be determined without the temporary buffer 103. This can be accomplished using heuristic or statistical algorithms. For instance, a measure of informational entropy of a data segment in question can be indicative of whether that data segment is encrypted, where a relatively high degree of informational entropy is indicative of an encrypted data segment, and a relatively low degree of informational entropy is indicative of a non-encrypted data segment. According to an exemplary algorithm, a predefined threshold is compared against the computed informational entropy and, if the computed value is above the threshold, the data segment (presumed to be possibly encrypted) is processed with the encryption key in an attempt to decrypt the data segment. Next, the informational entropy of the processed data segment is either compared against the threshold, or a difference between the originally-computed informational entropy of the possibly-encrypted data segment and the processed data segment is compared against a difference threshold. A substantial drop in entropy (represented as either a newly-computed informational entropy falling below the threshold, or as a difference exceeding the difference threshold) is indicative of the data segment having been successfully decrypted, implying that it had previously been encrypted. In a related embodiment, the informational-entropy-based determination of encryption status of a given data segment is applied in addition to a temporary buffer-based determination as discussed above to provide an additional level of assurance that the correct encryption status is set in the failure-recovery process.

At 603, if necessary, the encryption state indicator values are toggled to the correct value in the encrypted space mask by fault recovery engine 116. Therefore, the encrypted space mask will match the temporary data buffer and, consequently, the condition of the data segments on the drive. The new encrypted space mask can be saved to the drive and loaded into the memory in order to resume the previously-interrupted full-drive encryption process.

FIGS. 7A-7D are sequential state diagrams illustrating the execution of a robust full-drive encryption process in greater detail according to one embodiment of the invention, utilizing coordinator engine 110 and encryption engine 114. In these diagrams, the drive is represented as having four segments of four bits data to be encrypted, initially containing the plain, non-encrypted, values 1011, 1010, 1111, and 0101, as depicted at stage 702. The drive also has space allocated on it for the temporary data buffer, and the encrypted space mask, as depicted. The allocated space for the buffer and mask is allocated in an unused portion of the drive, which may also contain the application for performing the encryption process.

With this being a substantially simplified illustration of the drive, it should be understood that in a practical embodiment, each segment is likely be on many orders of magnitude larger, i.e., hundreds of kilobytes, megabytes, tens of megabytes, etc. Likewise, there may be a million or more of such segments on a modern drive. Accordingly, the temporary data buffer will have many more segments allocated to it, and the mask will have a size to represent the segments of data on the drive. In various embodiments, the drive can represent a partition, or some other designated portion of a physical drive, such that to manage encryption of the full physical drive, there may be multiple different versions of the buffer, mask, etc.

Figure 7A:
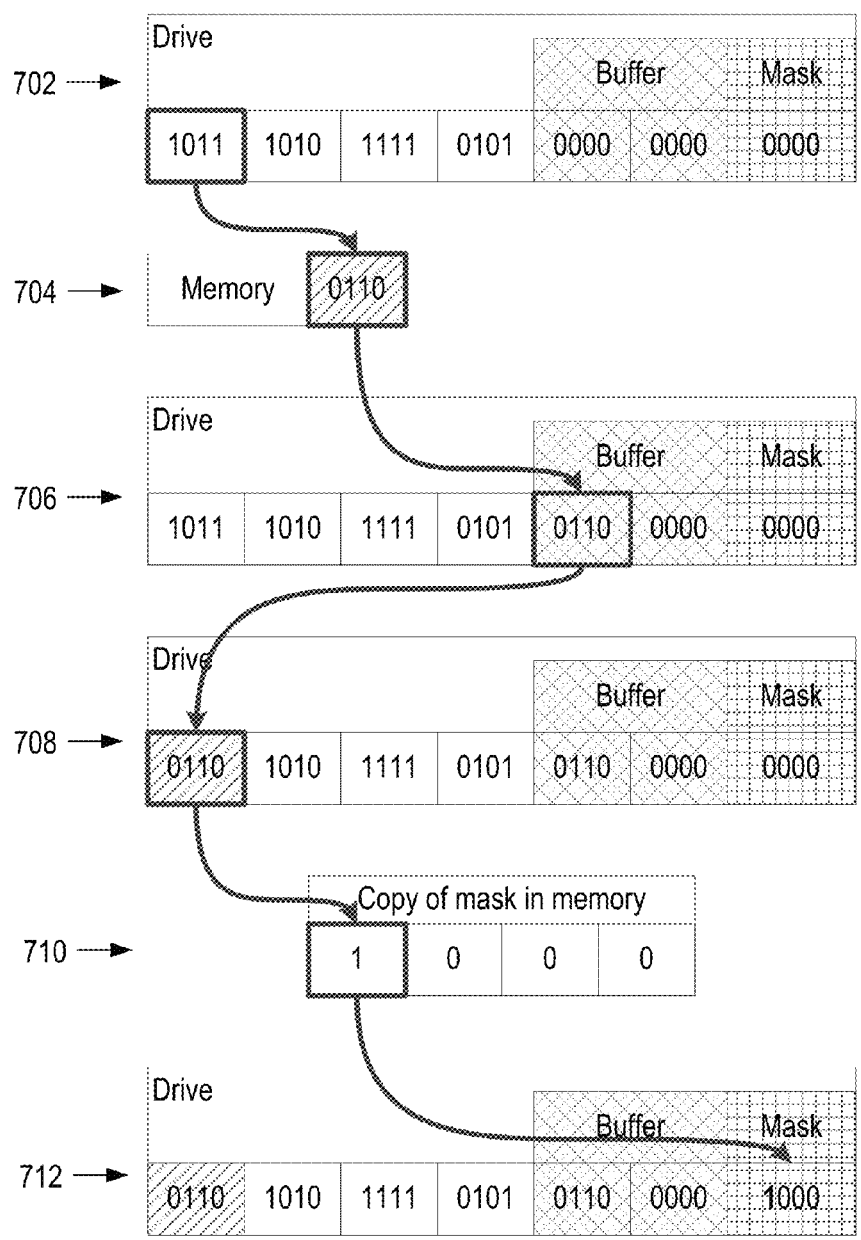
FIGS. 7A-7D are sequential state diagrams illustrating the execution of a robust full-drive encryption process in greater detail according to one embodiment of the invention.

FIG. 7A represents stages for encrypting the first segment of data according to the present example embodiment. The initial value of the mask is all 0 bits because the drive is presumed to be non-encrypted at this stage. At stage 704, the first segment is read to memory, and then encrypted to produce the value 0110. Next, at stage 706, the encrypted value is written to a first location in the allocated temporary data buffer. Next, at stage 708, the encrypted value for the first segment is written back to the first segment's location on the drive. At 710, the encrypted space mask is updated to reflect the encrypted state of the first segment on the drive. The first bit of the mask, corresponding to the first segment of the drive, is set to 1. At this stage, a copy of the mask stored in memory is updated, which is substantially faster than updating the copy of the mask stored on the drive.

The non-volatile copy of the encrypted space mask on the drive can be updated at this stage, or at a later stage, as discussed above. The updating can be occasional, periodic, responsive to a condition being satisfied, etc. In the present example, the mask on the drive is indeed updated, at stage 712.

Figure 7B:
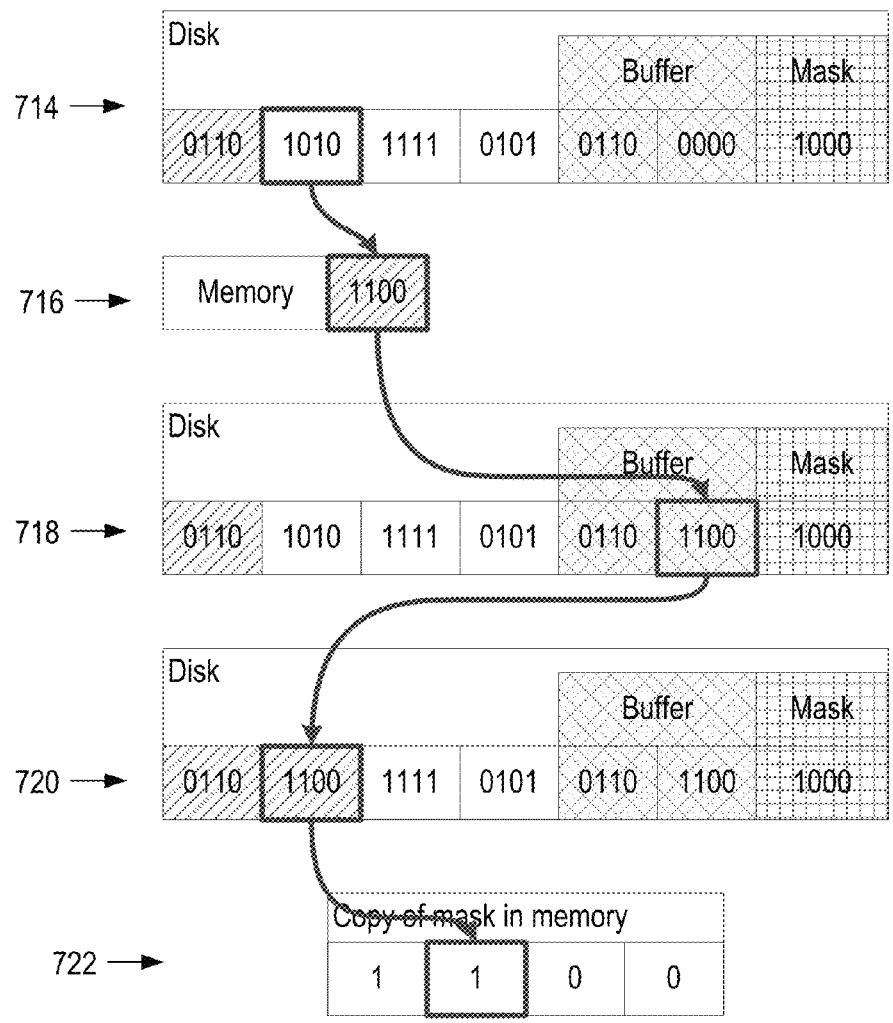

Turning now to FIG. 7B, the second segment of the drive is encrypted, beginning at stage 714. Stage 714 represents the same state of the drive as the conclusion of stage 712. The process proceeds to stage 716, at which the second segment is read to memory, and encrypted to produce a value of 1100. Next, at stage 718, the encrypted second segment is written to the second location of the temporary data buffer as depicted. At stage 720, the encrypted second segment is written to the second segment's location on the drive. At stage 722, the copy of the mask residing in memory is updated to toggle the second bit to indicate the encrypted state of the second segment. Here, the non-volatile copy of the mask residing on the drive is not updated.

Figure 7C:
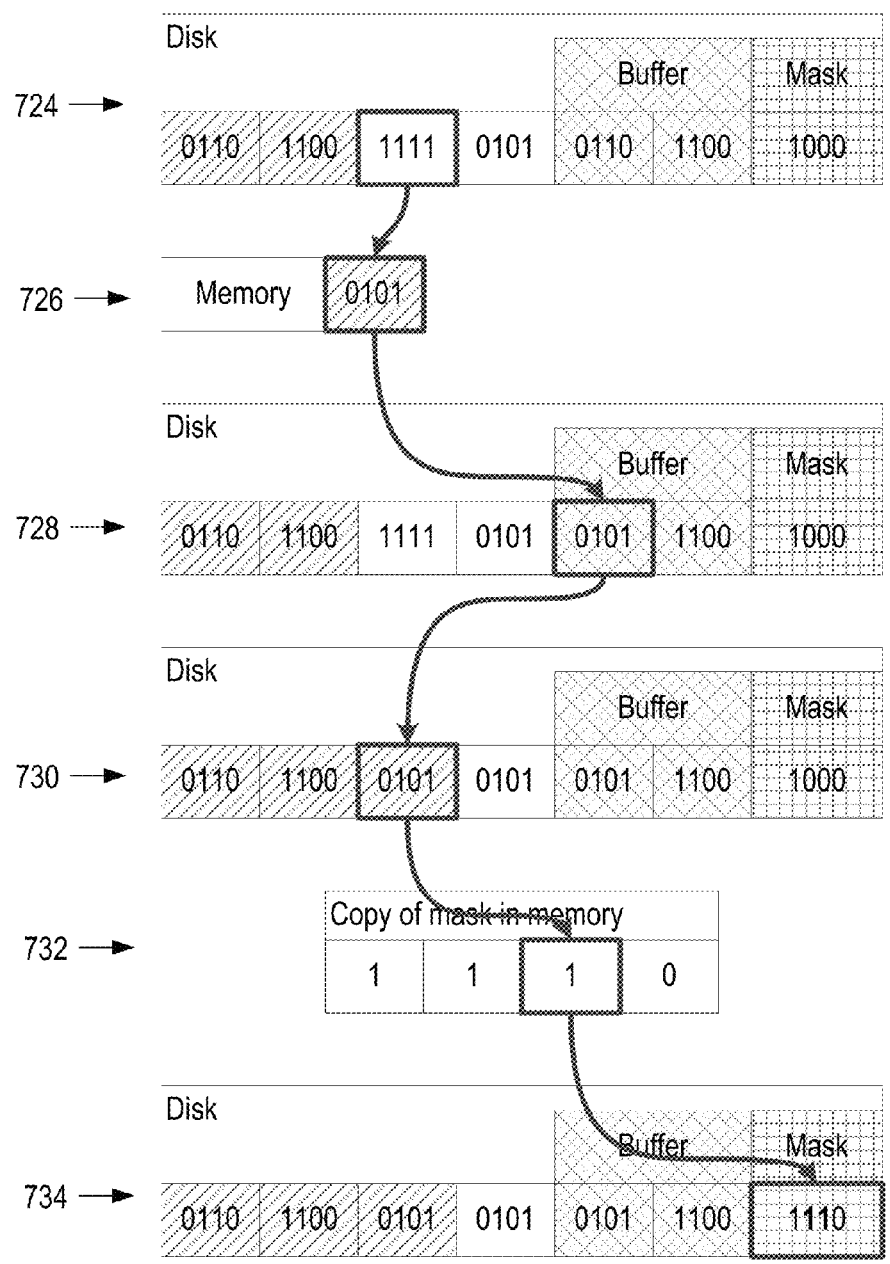

The process proceeds as illustrated in FIG. 7C to encrypt the third segment. Stage 724 represents the state of the drive following stage 722. The first two segments are encrypted; copies of these encrypted segments are stored in the temporary data buffer, but the non-volatile copy of the mask on the drive indicates that only the first segment is encrypted. This state is due to the fact that the non-volatile copy of the mask has not been updated after encrypting the second data segment. In spite of this apparent disparity, the correct encryption state of the second segment is discernible because the contents of the segment corresponding to the first non-toggled bit of the mask (i.e., in this case, the second segment) match the contents of the temporary buffer location corresponding to that segment (in this case, the second segment of the buffer).

The encryption process proceeds at stage 726, where the third segment is read to memory and encrypted to produce the value 0101. This new value is written to the temporary data buffer at stage 728 (overwriting the value of the first segment). There is no consequence to overwriting the first segment's value in the buffer because the non-volatile copy of the mask—as stored on the drive—already indicates that the first segment is encrypted. The encrypted value of the third segment is then written to the third segment's location on the drive at stage 730. At stage 732 the in-memory copy of the mask is updated. At stage 734, the non-volatile copy of the mask is updated—this time, with 1-valued bits corresponding to the second and third segments.

Figure 7D:
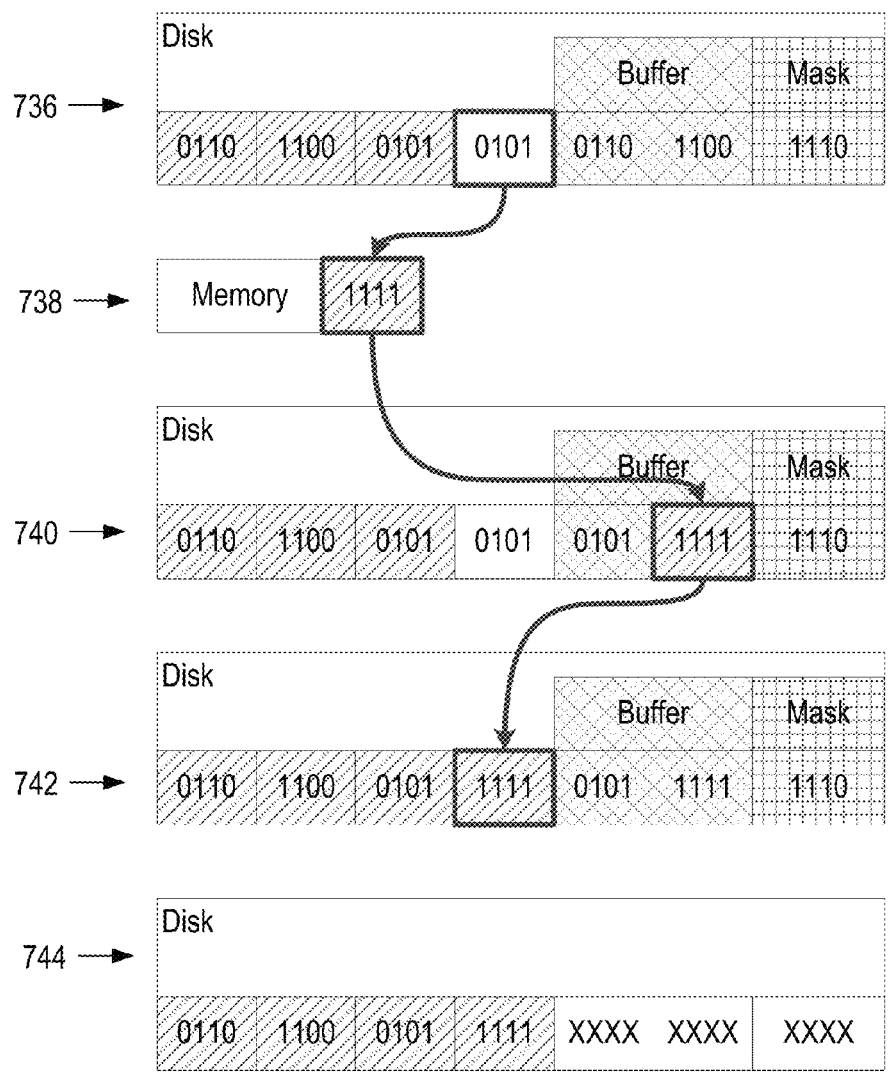

The process proceeds to encrypt the fourth segment, as depicted in the sequence of FIG. 7D. Stage 736 is equal to the state of the drive at the conclusion of stage 734. At stage 738, the fourth segment is copied to memory and encrypted to produce the value 1111. At stage 740, the encrypted third segment is copied to the corresponding location in the temporary data buffer. At stage 742, the encrypted fourth segment is written to the fourth segment's location on the drive. At this point, the drive is fully encrypted. An indicator to this effect is written to the drive, such as in a location used by the encrypted-drive management application. As indicated at stage 744, the portion of the drive allocated to the temporary data buffer and mask are no longer needed (reflected as "don't care" values X). These portions of the drive can be released for future use by other processes.

Figure 8:
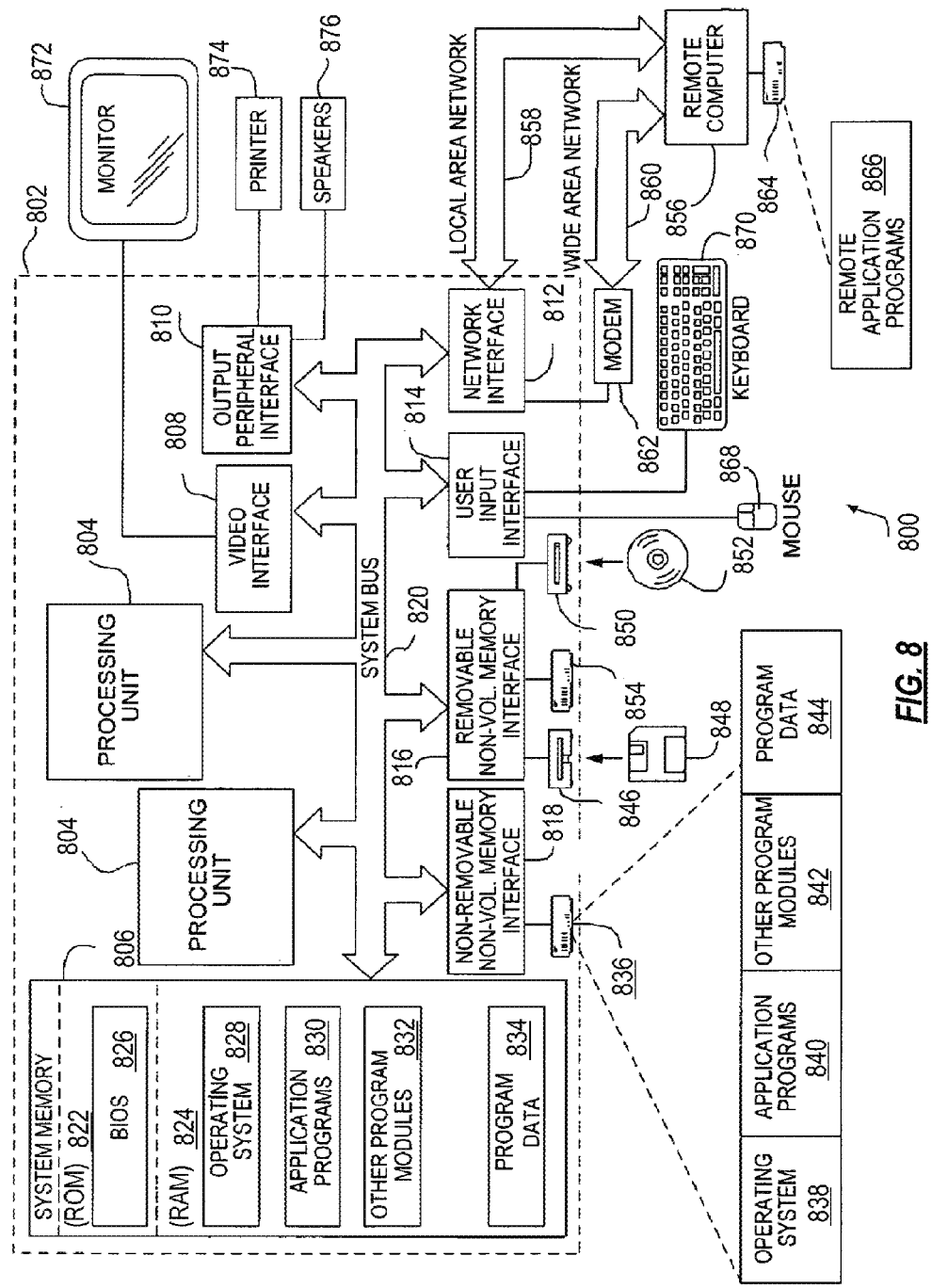
FIG. 8 is a diagram illustrating a general-purpose computer system on which aspects of the invention may be implemented according to various embodiments to create a special-purpose system.

FIG. 8 is a diagram illustrating in greater detail a computer system 800 on which aspects of the invention as described herein may be implemented according to various embodiments. The computer system 800 may include a computing device such as a personal computer 802. The personal computer 802 includes one or more processing units 804, a system memory 806, a video interface 808, an output peripheral interface 810, a network interface 812, a user input interface 814, removable 816 and non-removable 818 memory interfaces and a system bus or high-speed communications channel 820 coupling the various devices. In various embodiments, the processing units 804 may have multiple logical cores that are able to process information stored on computer readable media such as the system memory 806 or memory attached to the removable 816 and non-removable 818 memory interfaces 818. The computer 802 system memory 806 may include non-volatile memory such as Read Only Memory (ROM) 822 or volatile memory such as Random Access Memory (RAM) 824. The ROM 822 may include a basic input/output system (BIOS) 826 to help communicate with the other portion of the computer 802. The RAM 824 may store portions of various software applications such as the operating system 828, application programs 830 and other program engines 832. Further, the RAM 824 may store other information such as program or application data 834. In various embodiments, the RAM 824 stores information that requires low-latencies and efficient access, such as programs and data being manipulated or operated on. In various embodiments RAM 824 comprises Double Data Rate (DDR) memory, Error Correcting memory (ECC) or other memory technologies with varying latencies and configurations such as RAMBUS or DDR2 and DDR3. In this way, in various embodiments, the system memory 806 may store the input data store, access credential data store, operating memory data store, instruction set data store, analysis result data store and the operating memory data store. Further, in various embodiments, the processing units 804 may be configured to execute instructions that limit access to the aforementioned data stores by requiring access credential before access to the information is granted.

The removable 816 and non-removable 818 memory interfaces may couple the computer 802 to disk drives 836 such as SSD or rotational disk drives. These disk drives 836 may provide further storage for various software applications such as the operating system 838, application programs 840 and other program engines 842. Further, the disk drives 836 may store other information such as program or application data 844. In various embodiments, the disk drives 836 store information that doesn't require the same low-latencies as in other storage mediums. Further, the operating system 838, application program 840 data, program engines 842 and program or application data 844 may be the same information as that stored in the RAM 824 in various embodiments mentioned above or it may be different data potentially derivative of the RAM 824 stored data.

Further, the removable non-volatile memory interface 816 may couple the computer 802 to magnetic portable disk drives 846 that utilize magnetic media such as the floppy disk 848, Iomega® Zip or Jazz, or optical disk drives 850 that utilize optical media 852 for storage of computer readable media such as Blu-Ray®, DVD-R/RW, CD-R/RW and other similar formats. Still other embodiments utilize SSD or rotational disks housed in portable enclosures to increase the capacity of removable memory.

The computer 802 may utilize the network interface 812 to communicate with one or more remote computers 856 over a local area network (LAN) 858 or a wide area network (WAN) 860. The network interface 812 may utilize a Network Interface Card (NIC) or other interface such as a modem 862 to enable communication. The modem 862 may enable communication over telephone lines, coaxial, fiber optic, powerline, or wirelessly. The remote computer 856 may contain a similar hardware and software configuration or may have a memory 864 that contains remote application programs 866 that may provide additional computer readable instructions to the computer 802. In various embodiments, the remote computer memory 864 can be utilized to store information such as identified file information that may be later downloaded to local system memory 806. Further, in various embodiments the remote computer 856 may be an application server, an administrative server, client computers, or a network appliance.

A user may enter information to the computer 802 using input devices connected to the user input interface 814 such as a mouse 868 and keyboard 870. Additionally, the input device may be a trackpad, fingerprint scanner, joystick, barcode scanner, media scanner or the like. The video interface 808 may provide visual information to a display such as a monitor 872. The video interface 808 may be an embedded interface or it may be a discrete interface. Further, the computer may utilize a plurality of video interfaces 808, network interfaces 812 and removable 816 and non-removable 818 interfaces in order to increase the flexibility in operation of the computer 802. Further, various embodiments utilize several monitors 872 and several video interfaces 808 to vary the performance and capabilities of the computer 802. Other computer interfaces may be included in computer 802 such as the output peripheral interface 810. This interface may be coupled to a printer 874 or speakers 876 or other peripherals to provide additional functionality to the computer 802.

Various alternative configurations and implementations of the computer 802 are within the spirit of the invention. These variations may include, without limitation, additional interfaces coupled to the system bus 820 such as universal serial bus (USB), printer port, game port, PCI bus, PCI Express or integrations of the various devices described above into chipset devices such as the northbridge or southbridge. For example, in various embodiments, the processing unit 804 may include an embedded memory controller (not shown) to enable more efficient transfer of data from the system memory 806 than the system bus 820 may provide.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. An automated method for performing fault-recoverable full-drive encryption in a computer system having computing hardware including a data storage drive containing content to be encrypted, the method comprising:
   establishing, by the computer system, a plurality of segments in which the content to be encrypted is contained, each segment of the plurality of segments having a corresponding location on the data storage drive;
   allocating, by the computer system, a buffer in non-volatile storage that is configured to temporarily retain different subsets of the plurality of segments at various times;
   storing, by the computer system, an encrypted space mask in non-volatile storage that is configured to represent an encryption state of each segment of the plurality of segments;
   sequentially encrypting, by the computer system, each segment of the plurality of segments to produce a corresponding encrypted segment;
   in response to the encrypting of each segment, and prior to encrypting a subsequent segment, storing, by the computer system, a first copy of the encrypted segment in the buffer, and a second copy of the encrypted segment in a defined location on the data storage drive;
   updating, by the computer system, the encrypted space mask to represent a current encryption state of the plurality of segments;
   in response to an interruption of the sequential encrypting of the plurality of data segments, identifying, by the computer system, a second segment, of which a first encrypted copy is stored in the buffer, but wherein the encrypted space mask indicates the second segment as not being encrypted, the second segment being subsequent to a first segment indicated as being encrypted in the encrypted space mask;
   in response to the identifying of the second segment, determining, by the computer system, based on the first encrypted copy of the second segment stored in the buffer, a current encryption state of the second segment; and
   in response to the determining of the current encryption state of the second segment, correcting the encrypted space mask, by the computer system, to indicate the current encryption state of the second segment.

2. The method of claim 1, further comprising:
   identifying, by the computer system, the content to be encrypted; and
   determining, by the computer system, a data segment size by which the content is to be encrypted, such that all of the content is divided into a plurality of sequential segments, each segment having a corresponding location on the data storage drive.

3. The method of claim 2, wherein the data segment size is determined based on an ascertained quantity of good sectors of a partition of the data storage drive to be encrypted.

4. The method of claim 1, wherein the defined location in which the second copy of the encrypted segment is stored is the same location where that segment was stored prior to being encrypted.

5. The method of claim 1, wherein the defined location in which the second copy of the encrypted segment is stored is a different location from where that segment was stored prior to being encrypted.

6. The method of claim 1, wherein the encrypted space mask comprises at least one data structure selected from the group consisting of: a bitmap sequence, a tree structure, an n-dimensional array, an interval graph, a multi-level bitmap, or any combination thereof.

7. The method of claim 1, wherein the buffer stores a plurality of segments and is saved to the data storage drive in response to the encrypting of each segment, and wherein the encrypted space mask is saved to the data storage drive less frequently than the buffer.

8. The method of claim 1, wherein the encrypted space mask is saved into the non-volatile storage only in response to a mask-saving condition having been satisfied.

9. The method of claim 8, wherein the mask-saving condition is met when a predefined quantity of segments have been encrypted since a most recent saving of the encrypted space mask.

10. The method of claim 1, wherein determining the current encryption state of the second segment is based on a comparative value of the first encrypted copy of the second segment stored in the buffer and the second encrypted copy of the second segment stored in the defined location on the data storage drive.

11. The method of claim 1, wherein determining the current encryption state of the second segment is based on a determination of either a presence or an absence of the first encrypted copy of the second segment stored in the buffer.

12. The method of claim 1, wherein determining the current encryption state of the second segment is based on a comparison between a sequential segment index value that is incremented for each encrypted segment written to the data storage drive, and a mask index value that represents a quantity of encryption state indicators of the encrypted state mask that are indicative of an encrypted segment.

13. The method of claim 1, wherein determining the current encryption state of the second segment is based on a measure of informational entropy of the second encrypted copy of the second segment.

14. A system for performing fault-recoverable full-drive encryption in a computer system, the system comprising:
   computing hardware, including at least one processor, a memory device electrically interfaced with the processor, and a data storage drive containing content to be encrypted, the memory device containing instructions that, when executed, cause the processor to implement:
   a coordinator engine configured to establish a plurality of segments in which the content to be encrypted is contained, each segment of the plurality of segments having a corresponding location on the data storage drive;
   an encryption engine configured to sequentially encrypt each segment of the plurality of segments to produce a corresponding encrypted segment; and
   a fault recovery engine;
   the coordinator engine being further configured to:
   allocate a buffer in non-volatile storage that is configured to temporarily retain different subsets of the plurality of segments at various times;

store an encrypted space mask in non-volatile storage that represents an encryption state of each segment of the plurality of segments;

in response to the encrypting of each segment and prior to encrypting a subsequent segment, store a first copy of the encrypted segment in the buffer, and a second copy of the encrypted segment in a defined location on the data storage drive;

update the encrypted space mask to represent a current encryption state of the plurality of segments;

the fault recovery engine being configured to:

in response to an interruption of the sequential encrypting of the plurality of data segments, identify a second segment, of which a first encrypted copy is stored in the buffer, but wherein the encrypted space mask indicates the second segment as not being encrypted, the second segment being subsequent to a first segment indicated as being encrypted in the encrypted space mask;

determine, in response to the identifying of the second segment, determine, based on the first encrypted copy of the second segment stored in the buffer, a current encryption state of the second segment; and in response to determining the current encryption state of the second segment, correct the encrypted space mask to indicate the current encryption state of the second segment.

15. The system of claim 14, further comprising:
a drive parameter analysis engine configured to:
identify the content to be encrypted; and
determine a data segment size by which the content is to be encrypted, such that all of the content is divided into a plurality of sequential segments, each segment having a corresponding location on the data storage drive.

16. The system of claim 15, wherein the data segment size is determined based on an ascertained quantity of good sectors of a partition of the data storage drive to be encrypted.

17. The system of claim 14, wherein the buffer stores a plurality of segments and is saved to the data storage drive in response to the encrypting of each segment, and wherein the encrypted space mask is saved to the data storage drive less frequently than the buffer.

18. The system of claim 14, wherein the encrypted space mask is saved into the non-volatile storage only in response to a mask-saving condition having been satisfied.

19. The system of claim 18, wherein the mask-saving condition is met when a predefined quantity of segments have been encrypted since a most recent saving of the encrypted space mask.

20. The system of claim 14, wherein the current encryption state of the second segment is determined based on a comparative value of the first encrypted copy of the second segment stored in the buffer and the second encrypted copy of the second segment stored in the defined location on the data storage drive.

21. The system of claim 14, wherein the current encryption state of the second segment is determined based on a determination of either a presence or an absence of the first encrypted copy of the second segment stored in the buffer.

22. The system of claim 14, wherein the current encryption state of the second segment is determined based on a comparison between a sequential segment index value that is incremented for each encrypted segment written to the data storage drive, and a mask index value that represents a quantity of encryption state indicators of the encrypted state mask that are indicative of an encrypted segment.

23. The system of claim 14, wherein the current encryption state of the second segment is determined based on a measure of informational entropy of the second encrypted copy of the second segment.

24. A system for performing fault-recoverable full-drive encryption in a computer system having computing hardware including a data storage drive containing content to be encrypted, the system comprising:

means for establishing a plurality of segments in which the content to be encrypted is contained, each segment of the plurality of segments having a corresponding location on the data storage drive;

means for allocating a buffer in non-volatile storage that is configured to temporarily retain different subsets of the plurality of segments at various times;

means for storing an encrypted space mask in non-volatile storage that is configured to represent an encryption state of each segment of the plurality of segments;

means for sequentially encrypting each segment of the plurality of segments to produce a corresponding encrypted segment;

means for storing a first copy of the encrypted segment in the buffer, and a second copy of the encrypted segment in a defined location on the data storage drive in response to the encrypting of each segment, and prior to encrypting a subsequent segment;

means for updating the encrypted space mask to represent a current encryption state of the plurality of segments;

means for identifying a second segment, of which a first encrypted copy is stored in the buffer, but wherein the encrypted space mask indicates the second segment as not being encrypted, the second segment being subsequent to a first segment indicated as being encrypted in the encrypted space mask, in response to an interruption of the sequential encrypting of the plurality of data segments;

means for determining based on the first encrypted copy of the second segment stored in the buffer, a current encryption state of the second segment in response to the identifying of the second segment; and means for correcting the encrypted space mask to indicate the current encryption state of the second segment, in response to the determining of the current encryption state of the second segment.

* * * * *